March 26, 1935.  R. O. ASKEY  1,995,530
VOLTAGE REGULATOR
Filed July 3, 1931    2 Sheets-Sheet 1

Inventor:
Russel O. Askey.
By Brown, Jackson, Boettcher & Drewer Attys.

March 26, 1935.　　　R. O. ASKEY　　　1,995,530

VOLTAGE REGULATOR

Filed July 3, 1931　　　2 Sheets-Sheet 2

Inventor:
Russel O. Askey.
By Brown Jackson Bonner &
Dunner Attys

Patented Mar. 26, 1935

1,995,530

UNITED STATES PATENT OFFICE 1,995,530

VOLTAGE REGULATOR

Russel O. Askey, Maywood, Ill.

Application July 3, 1931, Serial No. 548,597

22 Claims. (Cl. 171—119)

This invention relates in general to voltage regulators for electric power lines and more particularly to alternating current voltage regulation.

In the distribution of alternating current there may be an appreciable voltage drop at the remote end of the line when a large load is thrown on the system. Consider the case of a line supplying power to a rather large motor load at the end remote from the source of power supply. During starting of the motor the current is momentarily very many times the normal motor current. The resulting line voltage drop may be sufficient to produce a distinct flicker in incandescent lamps supplied with electricity over the line. This is often quite objectionable. This flicker may be produced notwithstanding the fact that the voltage supplied to the line at the transformer remains constant during the momentary rush of current to the motor at the other end of the line. In such case the line voltage drop will be zero, or negligible, adjacent the source of power and will be maximum adjacent the motor.

It is one of the objects of the present invention to provide a high speed voltage regulator. The regulator of the present invention is of general application and may be used for, although it is not limited to, voltage regulation to eliminate or substantially reduce the flicker in incandescent lights that may be connected to a line such as above mentioned. I propose to provide a regulator which will be automatically effective upon an increase in the line current to boost the voltage of the line at the source, thereby reducing the extent of the voltage drop at the remote end. No attempt is made to maintain the voltage at the remote end constant for this would necessitate too great a boost in the voltage at the source of supply with resulting flicker in the lights adjacent the source of supply. Instead, I propose to increase the voltage at the source to reduce the voltage drop at the remote end, the amount of increase to be such that the theoretical point on the line where the voltage neither rises nor falls will coincide with the theoretical center of load of the line. As a result there will be very little voltage fluctuation on the line at the points adjacent the theoretical center of loading of the line. The voltage drop at the remote end of the line will be reduced, and there will be somewhat of a rise in voltage at the power source end of the line. The rise in voltage at one end of the line, and the drop in voltage at the other end will in most cases be of insufficient magnitude to cause a perceptible flicker in the lights that are connected to the line at the points of greatest voltage fluctuation. At any rate, where a flicker is caused it is of appreciably lesser magnitude than would otherwise be the case in the absence of the present regulator.

It is one of the objects of the present invention to produce a voltage regulator as above set forth wherein there are no mechanically moving parts and wherein the action is substantially instantaneous. I accomplish this, in the embodiments of my invention herein chosen for illustration, by providing a transformer arrangement including means for boosting the line voltage and means for bucking the line voltage, said two means being variable, the line voltage regulation being obtained by simultaneously increasing the boosting effect and decreasing the bucking effect. This is accomplished without the use of mechanically operating means which might be subject to inertia delays and to wear and tear. The desired results are obtained by providing regulating transformers connected to produce respectively boosting and bucking effects on the line voltage, and by controlling the boosting and bucking effects by means of direct current saturation of one or more of the transformer cores. The direct current furnished for saturation of the core is made proportionate to the line current being obtained from a rectifier which receives its alternating current from a miniature line controlled by the line current through a line drop compensator.

The preferred arrangement of the transformer is such that the boosting and bucking coils are mounted on cores which are provided with the same exciting coil, or the equivalent of one exciting coil. The arrangement is such that when the core carrying the bucking coil is saturated by direct current flux, thereby reducing the exciting alternating flux therein, there will be a corresponding increase in the exciting flux through the core carrying the boosting coil.

In order to prevent, or substantially reduce the alternating electromotive force induced in the saturating winding I propose, in one form of my invention, to divide the magnetic structure carrying the saturating winding into two magnetically independent parts and arrange the direct current coil in two parts, one on each core part, the direct current coil parts being electrically connected to have the induced alternating electromotive forces in opposition. As a result there will be substantially no alternating voltage impressed upon the direct current output side of the rectifier.

The attainment of the above and further objects of the present invention will be apparent from the following specification taken in conjunction with the accompanying drawings forming a part thereof.

In the drawings:—

Figure 1:
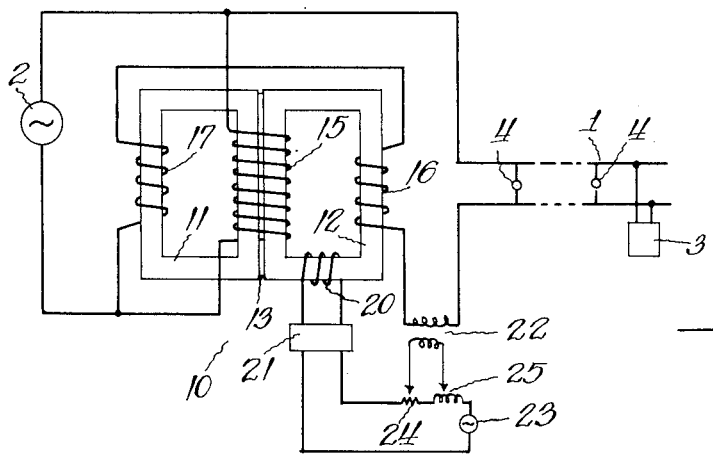
Figure 1 is a circuit diagram illustrating my improved regulating system.

Reference may now be had more particularly to the system shown in Figure 1. A secondary distribution line 1 is supplied with alternating current from a source 2 which may comprise a generator or the secondary of a transformer the primary of which is supplied with power from a high voltage transmission line. The power line 1 furnishes power to various consumers along the line, one consuming device being indicated at 3. Other consuming devices distributed along the line receive power therefrom, including incandescent lights which are indicated diagrammatically at 4—4. The power consuming devices located at 3 may comprise an appreciable proportion of the total power supplied by the line and may include electric motors which take a starting current of a value many times the normal load current. When the motor devices are started a large current flows over the line for a moment. The line voltage drop caused by this large momentary current may be sufficient to produce an appreciable flicker in the lights in the absence of any voltage regulating means. I provide a novel regulator for regulating the voltage drop so as to eliminate, or substantially reduce, the flicker in the lights.

My regulator is indicated in general at 10 and comprises two transformer cores indicated at 11 and 12 and provided with suitable windings connected in the circuit to produce the desired result. The transformer core sections are substantially independent of one another magnetically, being separated by a piece of insulation 13 so as to separate the magnetic paths of the two core sections. If desired, this piece of insulation may be omitted. The two core sections are provided with a common primary winding indicated at 15 and with separate secondary windings indicated at 16 and 17. The primary winding is connected across the source of potential 2 whereas the two secondary windings 16 and 17 are connected in series with one another and in series with the line 1. The two windings 16 and 17 are connected in opposition so that under normal conditions the winding 17 boosts the line voltage and the winding 16 bucks the line voltage. The arrangement may be such that under normal load conditions the voltage induced in the coil 17 is in excess of the voltage induced in the coil 16, and since these two coils are connected in opposition the net effect of these coils will be to boost the voltage under normal operating conditions. If desired the arrangement may be such that neither of the two coils predominates under normal operating conditions whereby the normal voltage of the line will be equal to the voltage of the source 2.

The core section 12 is provided with a tertiary winding 20 which is provided for receiving direct current to produce a magnetic saturation of the core 12. The winding 20 is supplied with direct current through a full wave rectifier 21 which is supplied with alternating current by way of a current transformer 22 and a source of alternating current 23 which is of the same frequency and in phase with the voltage supplied to the line 1 by the source 2. The secondary of the current transformer 22 supplies its current to the rectifier 21 by way of a variable resistance 24 and a variable inductance 25. The resistance and inductance are adjusted relative to one another and are made of such values as to constitute, together with the source of voltage 23, a miniature line corresponding to the line 1. This is known as a line drop compensator. The current flowing through this miniature line is a function of the current flowing through the line 1. Therefore the current on the output side of the rectifier 21, namely the direct current flowing through the saturating winding 20, is a function of the line current.

Electrical energy is supplied to consumers located along the line 1. Due to the drop in voltage produced by the current flowing in the line the voltage at the remote end of the line will necessarily be lower than the voltage at points closer to the source of power. Some point intermediate the ends of the line may be considered as the center of load distribution, this point being determined by the location of the various consumers receiving power from the line. My voltage regulator is preferably adjusted so that under normal loading conditions the regulator boosts the line voltage to maintain the voltage at the theoretical center of load distribution under normal loading condition equal to the voltage of the source 2. That is, the voltage boost through my device is of such a magnitude as to offset the drop through the supply circuit to the center of load distribution.

Assume that a motor of appreciable size and located at the remote end of the line 1 is being started. There will be a momentary rush of current through the line 1 resulting in an appreciable voltage drop through the line. A proportionate direct current will flow through the winding 20 of my regulator due to the effect of the line drop compensator. This will produce a condition of magnetic saturation in the core 12, or a condition approaching magnetic saturation. As a result of the saturation effect on the core 12 a larger proportion of the exciting flux produced by the primary winding 15 will flow through the core 11 and a smaller proportion will flow through the core 12. Therefore a greater voltage will be induced in the boosting coil 17 and a smaller voltage will be induced in the bucking coil 16. The net effect upon the line 1 will be an increase in voltage. My device is so adjusted that this increase in voltage is exactly equal to the line drop up to the theoretical center of load distribution on the line. Thus the momentary rush of current due to the starting of a large motor or the like at the end of the line will cause my regulator to regulate voltage so as to produce a slight increase in voltage at one end of the line in order to effect a smaller reduction in voltage at the other end of the line. This action is in most cases sufficient to prevent a noticeable flicker in incandescent lights that are supplied with current from the line 1. Under extreme conditions where the flicker still persists at the two ends of the line the extent of this flicker is so much reduced as to render it unobjectionable in the vast majority of instances.

As previously stated, the alternating current supplied by the source 23 is of the same frequency as and in phase with the voltage of the source 2. This means that the current supplied by the source 23 may be furnished from the source 2, either directly or by means of suitable taps on the primary or exciting winding 15.

In order to show the relationship between the line compensator circuit and the line, let it be assumed that no current is passing through the line. The current transformer 22 is then unenergized and the direction of current flow in the line compensator circuit is from the supply source 23 through the rectifier 21, thence through resistance 24 and reactance 25 and back to the source 23. This supply source 23 is in phase with the voltage of the exciting winding and is such that there will always be a small current delivered by the rectifier to the winding 20. Upon flow of line current in the line 1, the current transformer 22 is energized, and current in the secondary thereof passes through the reactance 25 thence toward the resistance 24 and back to the secondary winding, the amount of the resistance 24 and reactance 25 included in the circuit being determined by the top connections of the two conductors of the current transformer 22 therewith. It is thus apparent that current flow between the secondary current transformer connections to the reactance 25 and resistance 24 is opposite in direction to the current flow in this part of the line compensator circuit from the source 23, which current flows through the resistance 24 and thence through the reactance 25. This opposition of current flow shunts out the portion of the line between the current transformer taps to the resistance and reactance, and the current flow is then from source 23 to the rectifier 21, thence to resistance 24, thence through the current transformer tap and through the secondary of the transformer 22 back to the current transformer tap at the reactance 25, and thence to the source 23. Since the voltage of the current transformer thus tends to assist the voltage of the circuit from source 23 to rectifier 21, it is apparent that the current to the rectifier 21 is increased with increases in line current, and consequently the current in the coil 20 is correspondingly increased in accordance with increases in the line current. The voltage in the secondary of the current transformer, by this arrangement, will thus never tend to neutralize the voltage of the line compensator circuit from source 23, but tends to assist it in feeding current to the rectifier 21.

Figure 2:
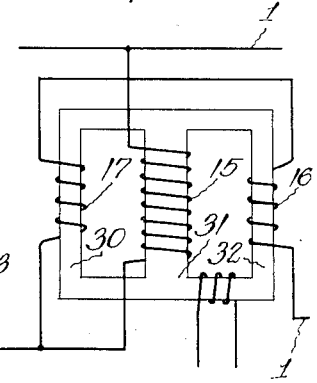
Figure 2 is a diagram illustrating a modified form of transformer for use in a system such as is shown in Figure 1.

In Figure 2 I have shown a transformer arrangement somewhat different from that shown in Figure 1 and adapted to be connected in circuit in the manner shown in Figure 1. This arrangement differs from that shown in Figure 1 only in that the two cores 11 and 12 have been made as a unitary structure having three legs or flux paths as indicated at 30, 31 and 32. Whereas in Figure 1 the winding 15 extends around the cores 11 and 12 it is shown in Figure 2 as extending around the portion 31 of the magnetic circuit, which portion is common to the right and left hand side of the core structure. In other respects this arrangement is the same as that shown in Figure 1.

Figure 3:
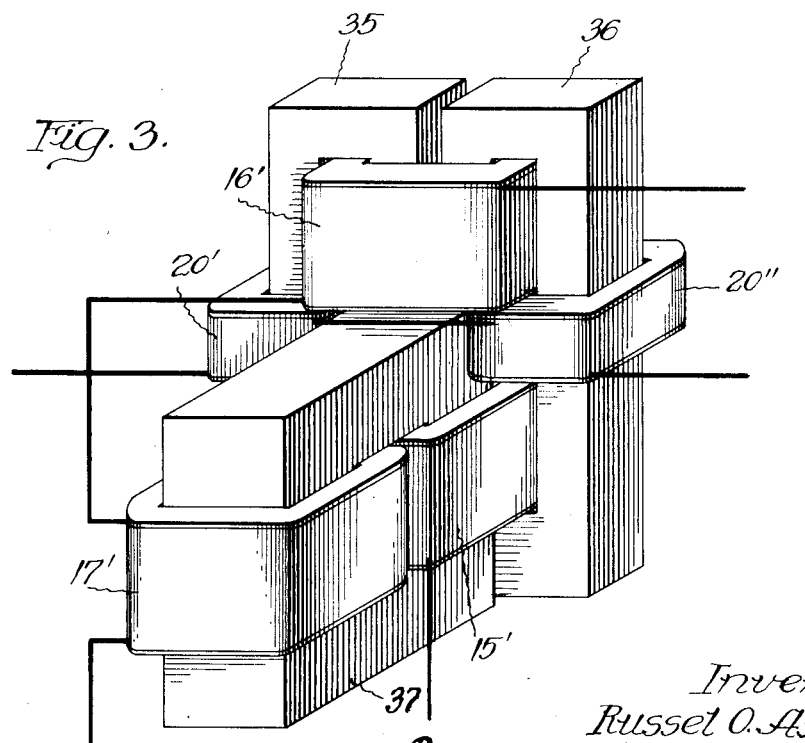
Figure 3 is an isometric view of a different transformer arrangement for use in the system shown in Figure 1.
Figure 4:
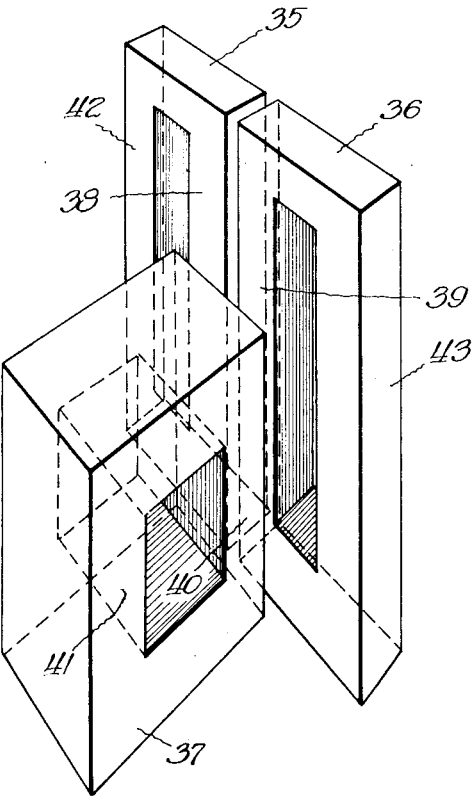
Figure 4 is a perspective view of the core structure of Figure 3.

In Figure 3 I have shown still another arrangement adapted to be connected in a circuit such as shown in Figure 1 for regulating the line voltage. The core structure is shown more particularly in Figure 4. The core comprises two similar portions 35 and 36 and a third portion 37. The core portions 35 and 36 are in the form of hollow rectangles being, in one form which I have made, about eleven inches high, three and one-half inches wide, and one and one-quarter inches thick. It is however to be understood that my invention is not limited to these precise dimensions, these dimensions being stated merely by way of illustration of one embodiment of the invention. The third core 37 is, in the above embodiment of my invention, about six inches wide, seven inches high and three inches thick, although here again it is to be understood that the invention is not limited to these precise dimensions.

The primary or exciting coil 15' embraces one leg of each of the three core portions, said coil extending around the side 38 of the core 35, the side 39 of the core 36, and the side 40 of the core 37. A secondary coil 16' is wound around the portions 38 and 39 of the cores 35 and 36. Another secondary coil 17' is wound around the portion 41 of the core 37. Two windings indicated at 20' and 20" are wound respectively around the portion 42 of the core 35 and around the portion 43 of the core 36.

The winding 15' is electrically connected in the same manner as is the winding 15 of Figure 1 and comprises the primary or exciting winding of the transformer. The windings 16' and 17' are electrically connected in series and are connected in circuit in the same manner as are the windings 16 and 17 of Figure 1. The winding 17' comprises the boosting winding and the winding 16' comprises the bucking winding, said two windings being connected so that the voltages induced therein are normally in opposition. The two coils 20' and 20" are electrically connected in series and are connected to a source of direct current in the same manner as is the coil 20 of Figure 1. The coils 20' and 20" constitute the means for saturating the cores 35 and 36. It is to be noted that the coils 20' and 20" which are connected to the source of direct current will also have induced therein an alternating voltage due to the alternating flux in the cores 35 and 36. These coils are therefore preferably connected so that the alternating voltages induced in the two coils are in opposition whereby no alternating current will flow through the coils 20' and 20". As a result, the exciting flux will be in opposition to the saturating flux during one half cycle in one core and during the other half cycle in the other core. This means that when direct current is flowing through the coils 20 and 20" one of the cores 35—36 will be saturated during one-half cycle and the other core will be saturated during the other half cycle if the amount of direct current flowing is not enough to carry the flux density substantially beyond the knee of the saturation curve of the iron cores. However, if the direct current is of sufficient magnitude to carry the magnetization of the iron cores substantially beyond the knee of their magnetization curves then both of the cores will be saturated during both half-cycles of the alternation produced by the exciting winding 15'. In this case the induced alternating voltages in the coils 20' and 20" will be substantially equal and opposite with the result that no alternating current will tend to flow through the circuit in which these coils are connected. This is a distinct advantage when using certain types of rectifiers since some high grade commercial rectifiers are not adapted to carry alternating current on their direct current side and are injured if alternating voltage is impressed upon the direct current side.

Figure 5:
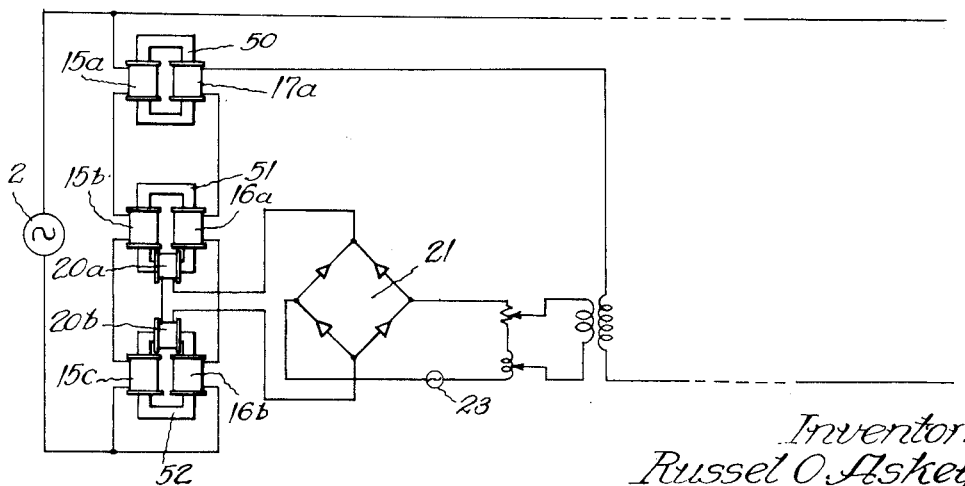
Figure 5 illustrates still another modification of my invention.

In Figure 5 I have shown a modified form of my invention employing three transformers. The circuit connections are, in principle, the same as shown in Figure 1. The three transformers are indicated at 50, 51 and 52. They are each provided with a primary winding 15a, 15b and 15c, said primary winding being connected in series across the source of supply 2. Each of the transformers is also provided with a secondary winding, the secondary windings being connected in series with one another and in series with the line. The secondary winding 17a of the transformer 50 is connected to boost the line voltage whereas the secondary windings 16a and 16b are connected to buck the line voltage. The transformers 51 and 52 are provided with tertiary or saturating windings 20a and 20b, respectively. These saturating windings are electrically connected in series and connected across a full wave rectifier 21 in the same manner as is the coil 20 of Figure 1. These two coils each have alternating voltages induced therein due to the alternating flux in the cores. They are connected in series, with the induced alternating voltages in opposition. As a result there will be no induced alternating voltage impressed across the rectifier. The mode of operation of this device is substantially the same as that of the device shown in Figure 3 and previously described. This arrangement permits of the use of standard commercial transformers such as are now available on the open market.

Where the type of rectifier used is such as to be unaffected by an alternating voltage impressed on the direct current side, it is possible to eliminate the transformer 52 or the transformer 51. If this is done then the number of turns on the primary and secondary coils of the remaining transformer should be increased to equal the number of turns on the corresponding coils of the two transformers. This, then, becomes an arrangement such as is shown in Figure 1, differing therefrom only in that the primary or exciting winding is split into two separate windings one of which is on one of the two transformer cores and the other is on the other core. The mode of operation of such a device is the same as of the device shown in Figure 1.

In the forms of my invention herein illustrated I have shown the regulator connected so as to be controlled in accordance with the magnitude and power factor of the line current. The invention is however not limited to such arrangement.

In compliance with the requirements of the patent statutes I have herein shown and described a few preferred embodiments of my invention. It is, however, to be understood that the invention is not limited to the precise embodiments herein shown, these being merely by way of illustration. What I consider new and desire to secure by Letters Patent is:—

1. In combination with an alternating current line, a voltage regulator comprising means normally tending to boost the voltage, means tending to decrease the voltage, and means controlled in accordance with the current in the circuit regulated for altering the relative boosting and bucking effects, said controlled means including means rendering the control responsive to variations in magnitude of each cycle in the alternating current wave.

2. In combination with an alternating current line, a voltage regulator for increasing the line voltage as the current increases, comprising a transformer having a primary and a secondary, said secondary being connected in series relation to the line and bucking the line voltage, means for saturating the transformer core to control the effect of the secondary winding, and means controlled in accordance with the line current for controlling the extent of saturation.

3. In combination with an alternating current line, a voltage regulator comprising a voltage boosting coil in series with the line, a voltage bucking coil in series with the line, exciting means for both coils, and means responsive to variations in magnitude of each cycle in the line current wave for decreasing the excitation of the bucking coil and simultaneously therewith increasing the excitation of the boosting coil.

4. In combination with an alternating current line, a voltage regulator comprising a voltage boosting coil in series with the line, a voltage bucking coil in series with the line, exciting means for both coils, and means for decreasing the excitation of the bucking coil and simultaneously therewith increasing the excitation of the boosting coil, said last named means including a saturating winding for the core of one of the coils, and means for supplying the saturating coil with current variable with variations in magnitude of each cycle in the line current wave.

5. In combination with an alternating current line, a voltage regulator comprising a voltage boosting coil in series with the line, a voltage bucking coil in series with the line, exciting means for both coils, and means for decreasing the excitation of the bucking coil and simultaneously therewith increasing the excitation of the boosting coil, said last named means including a plurality of direct current saturating windings connected in series with one another with their induced voltages in opposition, and means for supplying said saturating windings with direct current variable with variations in magnitude of each cycle of the alternating current wave of the line current.

6. In combination with an alternating current line, a voltage regulator comprising a regulating transformer arrangement including means for varying the voltage of the line under regulation, a miniature line which is the electrical equivalent of the line being regulated, a rectifier for rectifying the current flowing in the miniature line, and saturating means on said transformer arrangement supplied with current by said rectifier for controlling the regulating effect of the transformer arrangement.

7. In combination with an alternating current line, a voltage regulator comprising a regulating transformer arrangement including means for varying the voltage of the line under regulation, a miniature line which is the electrical equivalent of the line being regulated, a rectifier for rectifying the current flowing in the miniature line, and saturating means on said transformer arrangement supplied with current by said rectifier for controlling the regulating effect of the transformer arrangement, said saturating means comprising a pair of coils connected in series with one another with the induced alternating voltages therein in opposition.

8. In combination with an alternating current line, a voltage regulator including a pair of magnetically separated core sections, a coil each turn of which is in common to the two sections for producing an alternating magnetic flux through said sections in total amount proportionate to the line voltage, a pair of coils on said core sections, said coils being connected in opposition and in series effect with the line whereby one coil boosts the line voltage and the other coil bucks the line voltage, and means responsive to line current variation for shifting the flux distribution between the core members thereby varying the relative boosting and bucking effects.

9. In combination with an alternating current line, means for regulating the voltage of the line comprising means for boosting the voltage, means for bucking the voltage, and fast acting means responsive to the line current variations and following the line current variations within an interval less than the duration of one cycle for reducing the bucking effect, and simultaneously therewith increasing the boosting effect.

10. An alternating current line voltage regulator comprising three core sections, series connected primary coils on the three core sections, secondary coils on each of the three sections, the three secondary coils being connected in series with the voltage of one coil in opposition to the voltages of the other two, and direct current saturating windings on said other two core sections.

11. An alternating current line voltage regulator comprising three core sections, series connected primary coils on the three core sections, secondary coils on each of the three sections, the three secondary coils being connected in series with the voltage of one coil in opposition to the voltages of the other two, and direct current saturating windings on said other two core sections, said direct current windings being connected in series with their induced voltages in opposition.

12. In combination with an alternating current line, a voltage regulator comprising three core sections, series connected primary coils on the three core sections, secondary coils on each of the three sections, the three secondary coils being connected in series with the voltage of one coil in opposition to the voltages of the other two, direct current saturating windings on said other two core sections, a line, said three secondaries being connected in series relation to said line, and means for sending through the direct current coils a direct current which is a function of the line current.

13. In combination with an alternating current line, a voltage regulator comprising three core sections, primary coils on the three core sections, secondary coils on each of the three sections, the three secondary coils being connected in series with the voltage of one coil in opposition to the voltages of the other two, direct current saturating windings on said other two core sections, said direct current windings being connected in series with their induced voltages in opposition, a line, said three secondaries being connected in series relation to said line, and means for sending through the direct current coils a direct current which is a function of the line current.

14. A regulator including three transformer cores, a coil common to all three cores, a second coil common to two of the cores, and three separate coils individual to the respective cores.

15. A regulator including three transformer cores, a coil common to all three cores, a second coil common to two of the cores, and three separate coils individual to the respective cores, the coil that is common to two of the cores being connected in series with the coil that is individual to the other core.

16. A regulator including three transformer cores, a coil common to all three cores, a second coil common to two of the cores, and three separate coils individual to the respective cores, the coil that is common to two of the cores being connected in series with the coil that is individual to the other core, and the other two individual coils being connected in series with one another.

17. In combination two transformers having a common primary winding, separate secondary windings, and means for varying the relative excitation of the two secondaries by the primary, said last means comprising a saturating winding and means for producing a current flow through the saturating winding which is a function of the currents flowing through the secondaries.

18. In combination, three transformer cores having a common exciting winding, a secondary on one of the cores, and oppositely connected saturating coils on the other two cores for saturating one of them during one half cycle and the other one during the other half cycle.

19. In combination, three transformer cores having a common exciting winding, a secondary on one of the cores, and direct current saturating coils on each of the other cores for controlling the excitation of the core including the secondary, said saturating coils being connected with their induced voltages in opposition.

20. In combination, three transformer cores having a common exciting winding, a secondary on one of the cores, direct current saturating coils on each of the other cores for controlling the excitation of the core including the secondary, said saturating coils being connected with their induced voltages in opposition, and secondaries on each of the cores carrying the saturating coils, said last mentioned secondaries being connected in series with the first mentioned secondary and in opposed phase relation thereto.

21. In combination with an alternating current power line, a source of voltage supplying power to the line, an electric motor at the remote end of the line, electric lamps supplied with power from the line in the region of the motor, and means for reducing the flicker in the lamps upon starting of the motor, said means comprising a regulating transformer connected to the line adjacent the power source for altering the line voltage with respect to the voltage of the source to at least partly compensate for the line voltage drop caused by the starting of the motor, an auxiliary electric winding on the transformer for controlling the regulation by the transformer, and means responsive to the voltage drop in the portion of the line between the load and the regulating transformer for varying the current flow through said auxiliary coil in accordance with variations in magnitude of each cycle in the alternating current wave.

22. In an alternating current system wherein a power line supplies energy to a lighting load, means for reducing the flicker in the lights upon the sudden application of a large load that produces an appreciable voltage drop in the line, said means including a voltage boosting coil in series with the line, a voltage bucking coil in series with the line, exciting means for both coils, and means responsive to variations in magnitude of each cycle in the line current wave for decreasing the excitation of the bucking coil and simultaneously therewith increasing the excitation of the boosting coil to boost the line voltage responsive to an increase in current, all within a time interval of one cycle.

RUSSEL O. ASKEY.